(Model.)

3 Sheets—Sheet 1.

J. W. JONES.
MACHINE FOR CUTTING GREEN CORN FROM THE COB.

No. 251,237. Patented Dec. 20, 1881.

WITNESSES:

P. C. Dieterich

Fred G. Dieterich

INVENTOR:

John Winslow Jones

By Daniel Breed Atty (Model.)
J. W. JONES.
MACHINE FOR CUTTING GREEN CORN FROM THE COB.
No. 251,237. Patented Dec. 20, 1881.
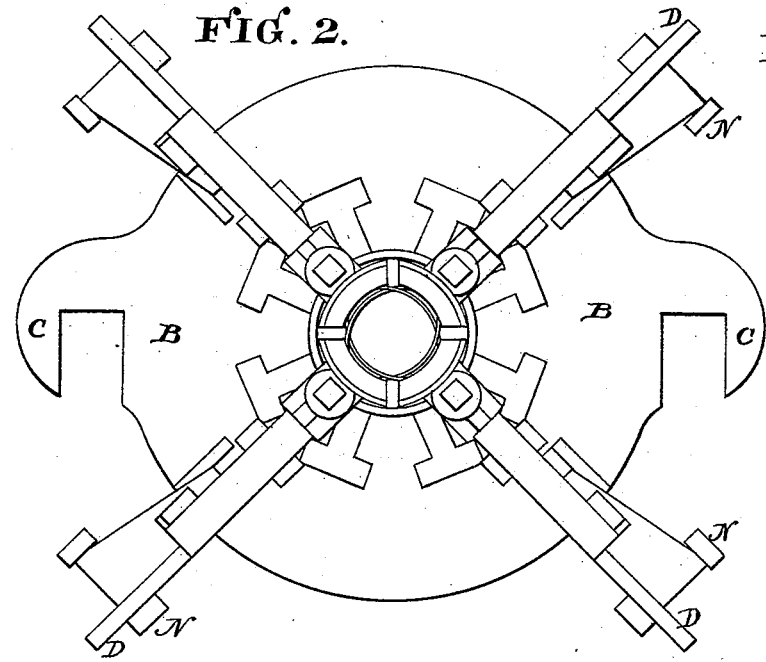
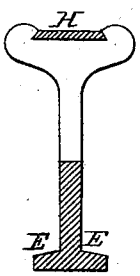
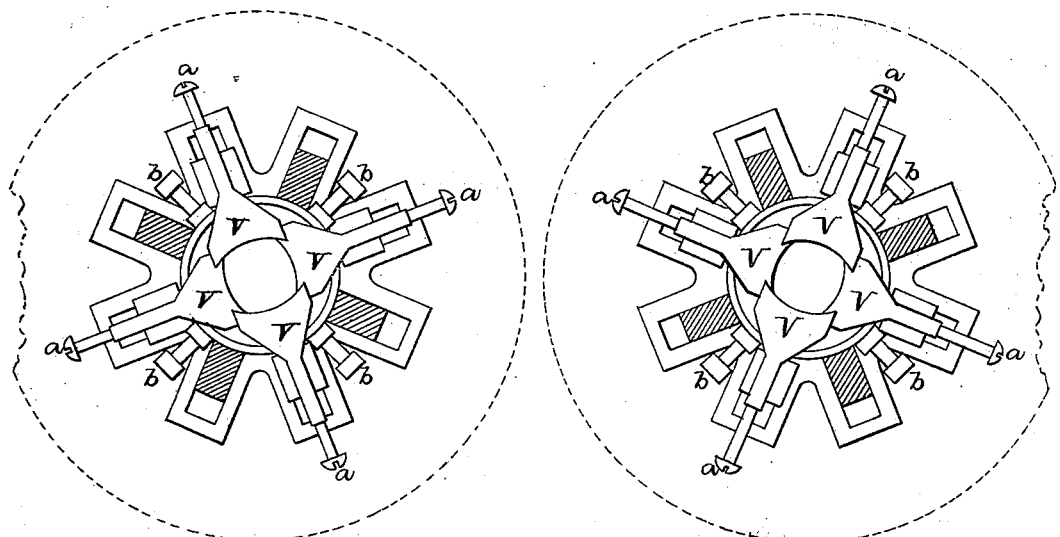
WITNESSES:
P. C. Dieterich
Fred G. Dieterich
INVENTOR
John W. Jones
By Daniel Breed Atty (Model.)

J. W. JONES.

MACHINE FOR CUTTING GREEN CORN FROM THE COB.

No. 251,237. Patented Dec. 20, 1881.

WITNESSES:
Fred J. Dieterich
P. C. Dieterich

INVENTOR:
John Winslow Jones
By Daniel Breed Atty

UNITED STATES PATENT OFFICE.

JOHN WINSLOW JONES, OF PORTLAND, MAINE.

MACHINE FOR CUTTING GREEN CORN FROM THE COB.

SPECIFICATION forming part of Letters Patent No. 251,237, dated December 20, 1881.

Application filed March 25, 1881. (Model.)

*To all whom it may concern:*

Be it known that I, JOHN WINSLOW JONES, a citizen of the United States, residing at Portland, in the county of Cumberland and State of Maine, have invented certain new and useful Improvements in Cutter-Heads for Machines for Removing Green Corn from the Cob, of which the following is a specification.

Heretofore the cutter-heads in use for this purpose have been insufficient in cutting and scraping capacity to do the work well on the largest ears of corn. When distended beyond their capacity the cutters left a portion of the corn uncut between the cutters, and by a faulty construction of the arms the cutting-edges are thrown out of their proper relation to the axis of the ear when large corn is operated upon. It has also been difficult to get at the interior mechanism of the cutter-head when required for repairs, adjustment, or cleaning.

The object of my invention is to obviate these difficulties, and thereby to facilitate the preparation of green corn for canning.

The invention therefore consists in novel features of construction and combination and arrangement of parts, all as will be hereinafter fully described, and particularly designated in the claims.

The cutter-head herein described is to be used in combination with proper mechanism for pushing the corn through the cutter-head.

Figure 1:
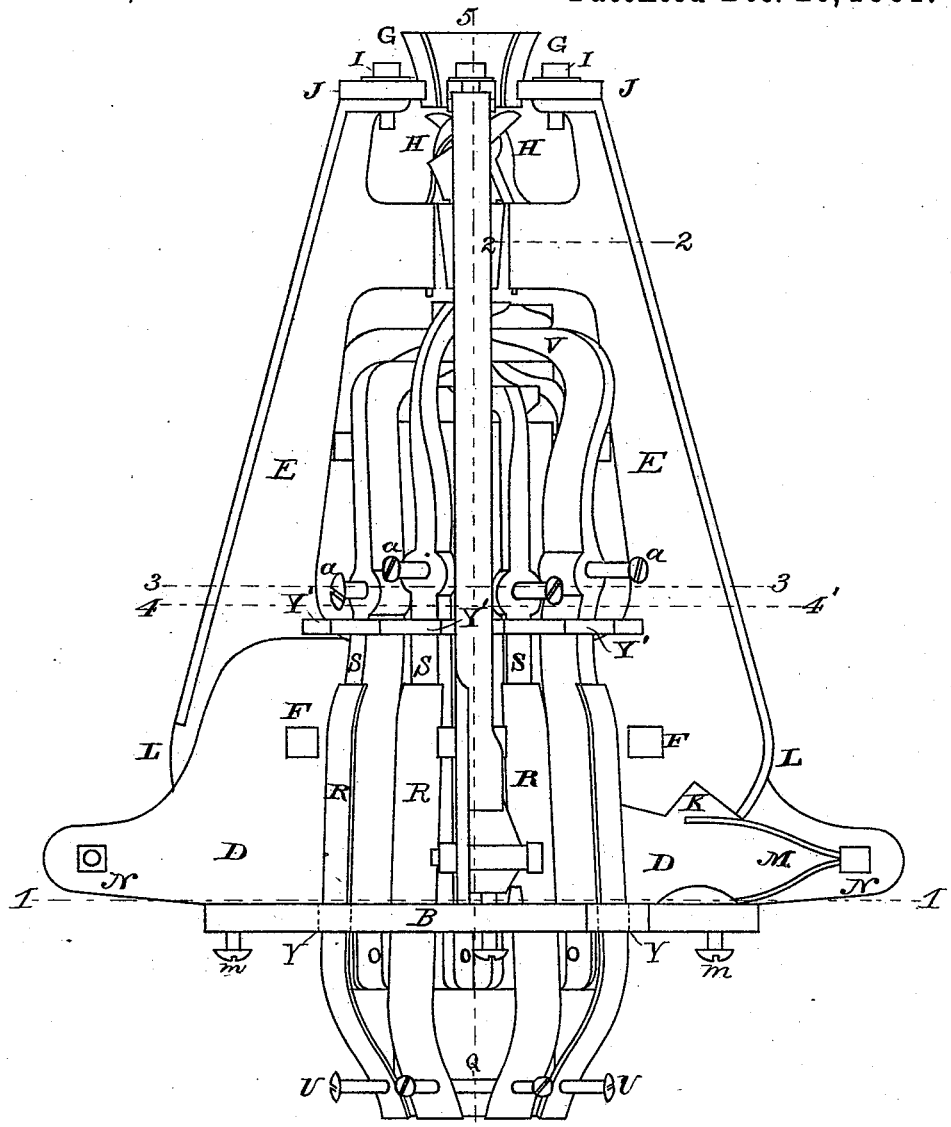
Figure 6:
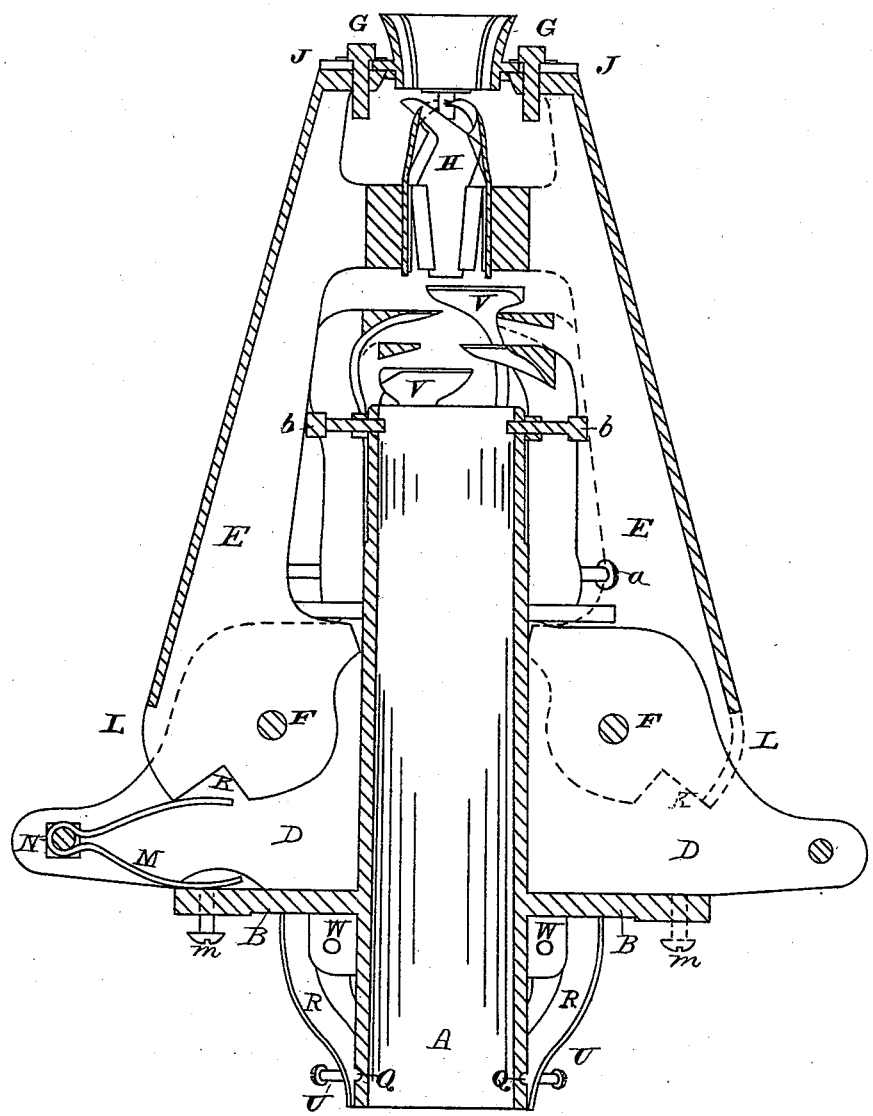

In the accompanying drawings, Figure 1 is a vertical elevation of my invention. Fig. 2 is a transverse section thereof on the line 1 1. Fig. 3 is a section of the cutter arm on line 2 2, showing projection on which the knife is hung. Fig. 4 is a section of my invention on line 3 3. Fig. 5 is a section thereof on the line 4 4, and Fig. 6 is a vertical section thereof on line 5 5.

Same letters show like parts.

A is a central tube, through which the cobs pass out after the edible parts of the kernels have been removed. This central tube has a flange plate, B, Fig. 2, provided with the ears C C, by means of which the cutter-head is connected with the operative part of the machine. Upon this plate B are the four brackets D D D D, as shown in Figs. 1 and 6, to which are pivoted four knife-arms, E E E E. These knife-arms E are pivoted at F to the brackets D. At the ends of the arms E are the gages G, which are movable toward and away from the central axial line of the cutter-head, and are adjustable in reference to the cutters H by means of the set-screws I and slots J. At the opposite ends of the arms E from those which bear the cutters H and gages G are made the notches K in the end of the arms E and the curved part L of the outer boundary of the arm. The spring M is fastened at N to the flange-brackets D, with its upper arm pressing against the lower side of the notch K on the arm E and its lower arm resting upon the flange-plate B for a point of resistance, with an adjusting-screw, $m$, passing through said plate and engaging with said spring for regulating the tension thereof.

At the end of the central tube, A, farthest from the cutters H the groove Q is cut quite around its periphery, and from this point the springs R of the scraper-arms S pass onward through proper perforations, Y, cut for the purpose in the plate B, and outside of and pressing upon the arms S. These springs R are eight in number, to correspond to the number of scraper-arms, and are arranged equidistant from each other around the central tube, A, and are perforated by a screw-tap over the groove Q, and through these perforations pass the screws U, the points of which screws bear in the groove Q. The springs R have therefore a bearing upon the screws U, a second bearing in the perforations Y in the plate B, and upon the back of the arms S they exert a pressure, the inclination of which is to press the arms S and the scrapers V inward toward the axis of the ear of corn when it passes through in course of operation.

Around the central tube, A, are the ears W, sixteen in number and arranged in eight pairs, the pairs being equidistant from each other around the tube A, each pair having a space between them equal to the width of the scraper-arms S, and between each pair of ears W a scraper-arm, S, is pivoted. From the ears W the arms S pass along parallel to the tube A, each arm passing through a slot, Y', which serves to keep the arm in place, the arms being tapped for the screws $a$ just beyond the slot Y'. These arms S are of different lengths, but all are of sufficient length to pass beyond the tube A, and at their ends are bent at right angles, and each is provided with the scraper V.

It will be observed that there are two arms of each different length, and these two are placed opposite to each other, so that their scrapers work in pairs, each one having its opposite. The screws $a$ have a nut put on behind the scraper-arms, and pass quite through the arms S, and their points rest upon the outside of the tube A.

Upon the end of the tube A nearest the scrapers, and underneath each cutter-arm, the screws $b$ are tapped in, and upon the head of each of the screws $b$ a cutter-arm, E, rests, the impulse of the spring M being to keep the arm E resting upon the screw $b$ when the cutter-head is not in use.

The edges of the cutters H and of the scrapers V are curved to adapt them to the cylindrical form of the ears of corn and the cob upon which their work is performed.

The parts of the cutter-head are adjustable in the following particulars, viz: The relative distance of the gages G and cutters H from the axial line of the ear of corn when operated upon, and the consequent depth of cut of the cutters H into the kernels, is regulated by means of the slots J and set-screws I of the gages, as hereinbefore described.

The tension of the springs R, and consequently the degree of their pressure upon the scraper-arms S, may be increased or diminished at will by turning the screws U.

The extreme inward scope of the scrapers V is controlled and regulated by the screws $a$, which have been herein described as passing through the scraper-arms S and bearing upon the central tube, A. These screws $a$ have a nut upon them above the scraper-arm, the use of which is to firmly bind the screw at any point at which it may be set. The cutter-arms are controlled and are adjustable in their inward scope by the screws $b$, upon the heads of which the cutter-arms rest.

Care must be taken in setting the screws $a$ and $b$ not to permit either cutters or scrapers to go far enough inward to interfere with the reciprocating plunger as it pushes the ears of corn through the cutter-head.

The operation of my invention is as follows: The cutter-head is placed in connection with the mechanism having the plunger working backward and forward by the hooks or ears C C of the plate B, or other proper means, with the end on which the gages G are shown toward the plunger and in such relation thereto that the ear of corn will be driven quite through between the cutters and scrapers.

The depth of cut of the knives, the inward scope of cutters and scrapers, and the degree of pressure of the springs upon the scraper-arms should all be adjusted in the manner and by the means described. In making these adjustments the cutter-arms are pulled apart from each other until the bearing-point of the spring M passes out of the notch K in the end of the arm and bears upon the adjacent rounded part L, when the impulse of the spring M will hold the arms opened instead of closed.

The arrangement of scrapers with their springs and adjusting-screws is not claimed in this case, as they form the subject-matter of a separate application.

What I claim as my invention, and desire to secure by Letters Patent, is—

1. The combination of the tube A, provided with the plate B, the pivoted cutter-arms having rounded and notched rear ends, the springs M, and adjusting-screws $b$, substantially as and for the purpose herein shown and described.

2. The combination of the tube A, provided with the plate B, the pivoted cutter-arms having rounded and notched rear ends, the springs M, and adjusting-screws $m$ and $b$, substantially as and for the purpose herein shown and described.

In testimony whereof I affix my signature in presence of two witnesses.

JOHN WINSLOW JONES.

Witnesses:
L. C. YOUNG,
DANIEL BREED.